(12) United States Patent  (10) Patent No.: US 10,078,198 B2
Lee et al.                  (45) Date of Patent:    Sep. 18, 2018

(54) PHOTOGRAPHING APPARATUS FOR AUTOMATICALLY DETERMINING A FOCUS AREA AND A CONTROL METHOD THEREOF

(71) Applicant: SAMSUNG ELECTRONICS CO., LTD., Suwon-si (KR)

(72) Inventors: Jeong-won Lee, Seongnam-si (KR); Kwon-jeong Kang, Gunpo-si (KR); Byung-ho Kim, Seoul (KR); Woo-seok Choi, Suwon-si (KR); Il-do Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 311 days.

(21) Appl. No.: 14/822,418

(22) Filed: Aug. 10, 2015

(65) Prior Publication Data

US 2016/0042526 A1    Feb. 11, 2016

Related U.S. Application Data

(60) Provisional application No. 62/034,914, filed on Aug. 8, 2014, provisional application No. 62/034,894, filed on Aug. 8, 2014.

(30) Foreign Application Priority Data

Apr. 14, 2015  (KR) .................. 10-2015-0052446

(51) Int. Cl.
  *H04N 5/232*  (2006.01)
  *G02B 7/36*   (2006.01)
  *G03B 13/36*  (2006.01)

(52) U.S. Cl.
  CPC ............. *G02B 7/365* (2013.01); *G03B 13/36* (2013.01); *H04N 5/23212* (2013.01); *H04N 5/23216* (2013.01); *H04N 5/23293* (2013.01)

(58) Field of Classification Search
  CPC ...... G02B 7/34; G03B 13/36; H04N 5/23212; H04N 5/23216; H04N 5/23293
  See application file for complete search history.

(56) References Cited

U.S. PATENT DOCUMENTS

| | | | |
|---|---|---|---|
| 6,118,484 A | 9/2000 | Yokota et al. | |
| 7,860,382 B2 | 12/2010 | Grip | |
| 8,836,849 B2 | 9/2014 | Noda | |
| 2002/0036257 A1* | 3/2002 | Yamshita | H04N 5/232 348/294 |

(Continued)

FOREIGN PATENT DOCUMENTS

| | | |
|---|---|---|
| JP | 2008-268403 A | 11/2008 |
| JP | 4577445 B2 | 11/2010 |

(Continued)

OTHER PUBLICATIONS

Yang Cao, et al., "Single Image Multi-focusing Based on Local Blur Estimation", 2011 Sixth International Conference on Image and Graphics, 2011, IEEE, Computer Society, pp. 168-175.

(Continued)

*Primary Examiner* — Sinh Tran
*Assistant Examiner* — Selam Gebriel
(74) *Attorney, Agent, or Firm* — Sughrue Mion, PLLC

(57) ABSTRACT

An imaging apparatus is provided, which includes an image sensor which includes a plurality of image pixels and a plurality of sensing pixels, and is configured to capture images through collection of light that is incident through a lens and the plurality of phase sensing pixels; and a processor configured to divide a region of interest of the image sensor into a plurality of sub-regions of interest, calculate disparity information of objects that correspond to the plurality of sub-regions of interest using at least one of the plurality of phase sensing pixels included in the plurality of sub-regions of interest, and determine a focal region in the region of interest on the basis of the disparity information. Accordingly, user convenience is increased.

18 Claims, 19 Drawing Sheets

(56) References Cited

U.S. PATENT DOCUMENTS

| | | |
|---|---|---|
| 2008/0258039 A1 | 10/2008 | Kusaka |
| 2009/0066830 A1 | 3/2009 | Fujii et al. |
| 2009/0195666 A1 | 8/2009 | Chen et al. |
| 2010/0321506 A1 | 12/2010 | Li et al. |
| 2012/0099006 A1 | 4/2012 | Matsuo et al. |
| 2013/0182900 A1* | 7/2013 | Ishii ............... H04N 5/23212 382/103 |
| 2013/0258168 A1* | 10/2013 | Aoki ................... G02B 7/34 348/349 |
| 2014/0313371 A1* | 10/2014 | Sambonsugi ......... G03B 13/36 348/231.6 |
| 2014/0347532 A1* | 11/2014 | Kang ................. H04N 5/351 348/294 |

FOREIGN PATENT DOCUMENTS

| | | |
|---|---|---|
| JP | 2012-203130 A | 10/2012 |
| JP | 5147474 B2 | 2/2013 |
| JP | 5207797 B2 | 6/2013 |
| JP | 2014-238517 A | 12/2014 |
| KR | 10-2008-0084563 A | 9/2008 |
| KR | 10-2011-0080391 A | 7/2011 |
| KR | 10-2013-0111172 A | 10/2013 |

OTHER PUBLICATIONS

Ke Han, et al., "A New Auto-Focusing Method Based on WBDCT for Many Object Situations", Ninth ACIS International Conference on Software Engineering, Artificial Intelligence, Networking, and Parallel/Distributed Computing, IEEE, Computer Society, 2008, pp. 481-484.

Lian-jie Liu, et al., "A Fast Auto-Focusing Technique for Multi-Objective Situation", 2010 International Conference on Computer Application and System Modeling (ICCASM 2010), IEEE, pp. 607-610.

* cited by examiner

|    |    |    | 1020 |    | 110 |
|----|----|----|------|----|-----|
| 10 | 13 | 16 | 7    | 9  | 15  |
| 5  | 8  | 1  | 7    | 8  | 18  |
| 2  | 3  | 7  | 10   | 18 | 15  |
| 4  | 2  | 10 | 7    | 2  | 7   |

1010

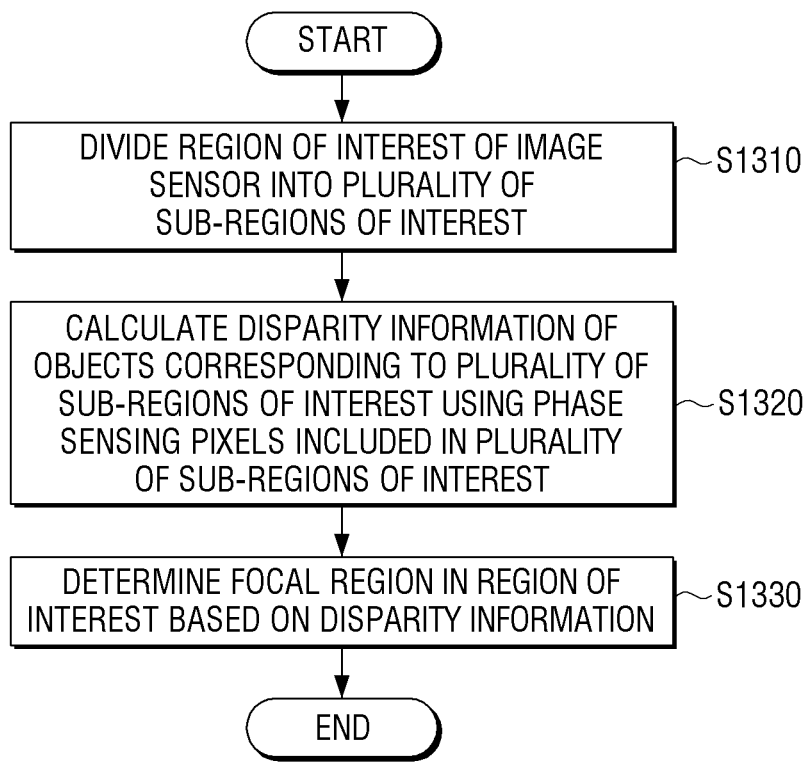

PHOTOGRAPHING APPARATUS FOR AUTOMATICALLY DETERMINING A FOCUS AREA AND A CONTROL METHOD THEREOF

CROSS-REFERENCE TO RELATED APPLICATIONS

This application claims priority from Korean Patent Application No. 10-2015-0052446, filed on Apr. 14, 2015 in the Korean Intellectual Property Office, and U.S. Provisional Application Nos. 62/034,894 and 62/034,914, filed on Aug. 8, 2014 in the United States Patent and Trademark Office, the disclosures of which are incorporated herein in their entireties by reference.

BACKGROUND

1. Field

Apparatuses and methods consistent with exemplary embodiments relate to capturing an image of an object through automatic determination of a focal region.

2. Description of the Related Art

In general, a focus method may be classified into contrast auto focus and phase auto focus.

FIG. 1A is a diagram explaining contrast auto focus. The contrast auto focus is to adjust a lens position up to a position having the highest contrast using the characteristic that an accurately focused photo has a clear contour to heighten the contrast whereas an unfocused photo has an unclear contour to lower the contrast. That is, according to the contrast auto focus, focusing is performed by measuring the contrast for each lens position as changing the lens position and adjusting the lens to the lens position having the highest contrast.

FIG. 1B is a diagram explaining phase auto focus. The phase auto focus is to detect an actual focus position after determining to what extent an object is focused using a phase difference between phase-sensed pixels in an image.

A small camera uses the contrast auto focus which has drawback of low speed while a digital single-lens reflex (DSLR) camera uses the phase auto focus which has drawback of inaccuracy in comparison to the contrast auto focus. Accordingly, a method for obtaining a focus through mixing of the two methods as described above has recently been developed.

However, even in the case of using the method for obtaining a focus through mixing of the two methods, the DSLR camera provides a plurality of focal regions as illustrated in FIG. 2A, and thus a desired object is unable to be focused unless a user determines any one of the plurality of focal regions. That is, it is required to determine the focal region regardless of the focusing method.

In a small camera, a function of determining the focal region through recognition of a human face as shown in FIG. 2B may be provided. However, if the object is not the human face, the use of such a function is restricted.

Further, if the contrast auto focus is used to adjust the focus in a small camera, contrast values as shown in FIG. 1A may be obtained. In this case, the small camera determines the lens position that corresponds to the highest contrast value on the right side. However, a user may desire to set the lens position that corresponds to the second highest contrast value on the left side. In this case, additional use of the phase auto focus is unable to solve such a problem, and the user is unable to capture an image of a desired object.

SUMMARY

Exemplary embodiments address at least the above problems and/or disadvantages and other disadvantages not described above. Also, the exemplary embodiments are not required to overcome the disadvantages described above, and may not overcome any of the problems described above One or more exemplary embodiments provide an imaging apparatus and a method for controlling the same, which may promptly analyze information about a plurality of objects even in the case where the plurality of objects exist and automatically determine a focal region with respect to any one of the plurality of objects to perform imaging.

According to an aspect of an exemplary embodiment, there is provided an imaging apparatus including: an image sensor which includes a plurality of image pixels and a plurality of sensing pixels, and is configured to capture images through collection of light that is incident through a lens and the plurality of phase sensing pixels; and a processor configured to divide a region of interest of the image sensor into a plurality of sub-regions of interest, calculate disparity information of objects that correspond to the plurality of sub-regions of interest using at least one of the plurality of phase sensing pixels included in the plurality of sub-regions of interest, and determine a focal region in the region of interest on the basis of the disparity information.

The processor may be further configured to determine the focal region in the region of interest through calculation of a movement distance and reliability information of the lens corresponding to a position of the lens on the basis of the disparity information.

The processor may be further configured to divide the region of interest into a center sub-region and a peripheral sub-region to form a first pair, divide into a left sub-region and a right sub-region to form a second pair, and divide into an upper sub-region and a lower sub-region to form a third pair.

The processor may be further configured to calculate movement distances of the lens to perform focusing with respect to the sub-regions of the first to third pairs, determine one of the pairs having the greatest difference between the movement distances of the lens among the first to third pairs, and determine one of the sub-regions of the pair having the greatest difference as the focal region.

The imaging apparatus may further include: a display; and a user interface configured to receive a user input that selects the one of the pairs having the greatest difference. The processor is further configured to control the display to display a user interface (UI) that indicates the pair having the greatest difference, and in response to the user input being recognized, determine one of the sub-regions of the selected pair as the focal region.

The processor may be further configured to determine the focal region in the region of interest by dividing the region of interest into M rows and N columns to obtain the plurality of sub-regions having the same size and grouping adjacent ones of the plurality of sub-regions in response to a difference between movement distances of the lens with respect to the adjacent sub-regions is equal to or smaller than a predetermined value.

The plurality of sub-regions may form at least one of a first group having the shortest distance to the object, a second group having the highest reliability, and a third group to which the largest number of sub-regions of interest belong. The processor may be further configured to determine one of the first group, the second group, and the third group as the focal region.

The processor may be further configured to perform the grouping only with one or more of the plurality of sub-regions which have a reliability higher than a predetermined value.

The movement distance of the lens may be information that is determined from the disparity information calculated through phase auto focus with respect to the position of the lens.

The processor may be further configured to capture two of the images using two of the plurality of phase sensing pixels that correspond to the plurality of sub-regions of interest, and calculate the disparity information through cross-correlation of the two images.

According to another aspect of an exemplary embodiment, there is provided a method for controlling an imaging apparatus provided with an image sensor that includes a plurality of image pixels and a plurality of phase sensing pixels and captures images through collection of light incident through a lens and the plurality of sensing pixels. The method may include: dividing a region of interest of the image sensor into a plurality of sub-regions of interest; calculating disparity information of objects that correspond to the plurality of sub-regions of interest using at least one of the plurality of phase sensing pixels included in the plurality of sub-regions of interest; and determining a focal region in the region of interest on the basis of the disparity information.

The determining the focal region may include: calculating a movement distance and reliability information of the lens corresponding to a position of the lens on the basis of the disparity information; and determining the focal region in the region of interest using the movement distance and reliability information of the lens.

The dividing the region of interest into the plurality of sub-regions of interest may include dividing the region of interest into a center sub-region and a peripheral sub-region to form a first pair, dividing into a left sub-region and a right sub-region to form a second pair, and dividing into an upper sub-region and a lower sub-region to form a third pair.

The determining the focal region may include: calculating movement distances of the lens to perform focusing with respect to the sub-regions of the first to third pairs; determining one of the pairs having the greatest difference between the movement distances of the lens among the first to third pairs; and determining one of the sub-regions of the pair having the greatest difference as the focal region.

The determining the focal region may further include: displaying a user interface (UI) that indicates the pair having the greatest difference between the movement distances of the lens; receiving a user input that selects one of the pairs having the greatest difference between the movement distances of the lens; and determining one of the sub-regions of the selected pair as the focal region.

The dividing the region of interest may include dividing the region of interest into M rows and N columns to obtain the plurality of sub-regions having the same size. The determining the focal region may include grouping of adjacent ones of the plurality of sub-regions in response to a difference between movement distances of the lens with respect to the adjacent sub-regions of interest is equal to or smaller than a predetermined value.

The plurality of sub-regions may form at least one of a first group having the shortest distance to the object, a second group having the highest reliability, and a third group to which the largest number of sub-regions of interest belong. The determining the focal region may further include determining one of the first group, the second group, and the third group as the focal region.

The determining the focal region may further include grouping only one or more of the plurality of sub-regions which have a reliability higher than a predetermined value.

The movement distance of the lens may be information that is determined from the disparity information calculated through phase auto focus with respect to the position of the lens.

The calculating the disparity information may include capturing two of the images using two of the phase sensing pixels that correspond to the plurality of sub-regions of interest, and calculating the disparity information through cross-correlation of the two images.

As described above, according to various exemplary embodiments of the present disclosure, since the imaging apparatus calculates the information about the objects more promptly and automatically determines the focal region accordingly, user satisfaction can be improved.

BRIEF DESCRIPTION OF THE DRAWINGS

The above and other aspects will be more apparent by describing certain exemplary embodiments, with reference to the accompanying drawings, in which:

FIGS. 10A and 10B are diagrams explaining a method for determining a focal region in the case where a region of interest is a whole image sensor according to an exemplary embodiment;

FIG. 13 is a flowchart explaining a method for controlling an imaging apparatus according to an exemplary embodiment.

DETAILED DESCRIPTION OF EMBODIMENTS

Figure 1A:
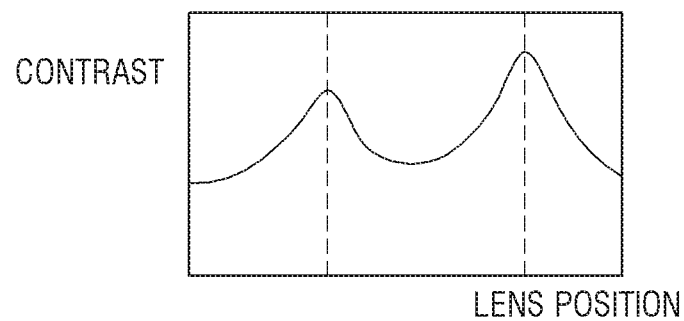
FIGS. 1A and 1B are diagrams explaining contrast auto focus and phase auto focus.
Figure 1B:
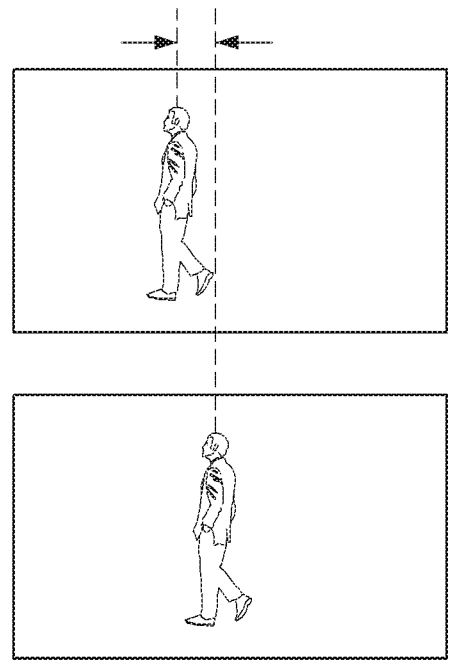
Figure 2A:
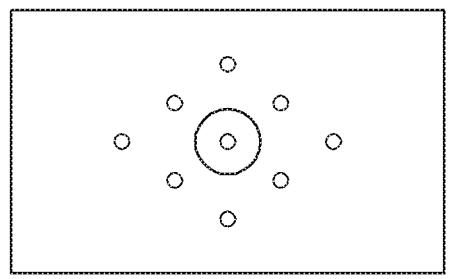
FIGS. 2A and 2B are diagrams explaining problems of a method for setting a focal region in the related art.
Figure 2B:
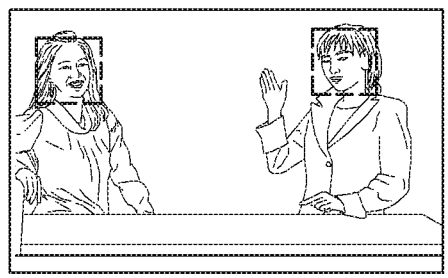

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the disclosure with unnecessary detail.

Hereinafter, exemplary embodiments are described in detail with reference to the accompanying drawings.

Figure 3A:
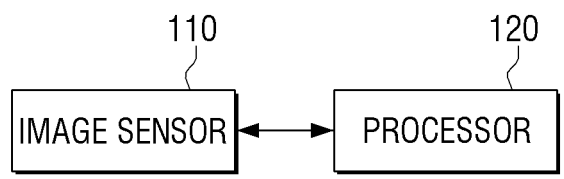
FIGS. 3A and 3B are block diagrams illustrating the configuration of an imaging apparatus according to an exemplary embodiment.
Figure 3B:
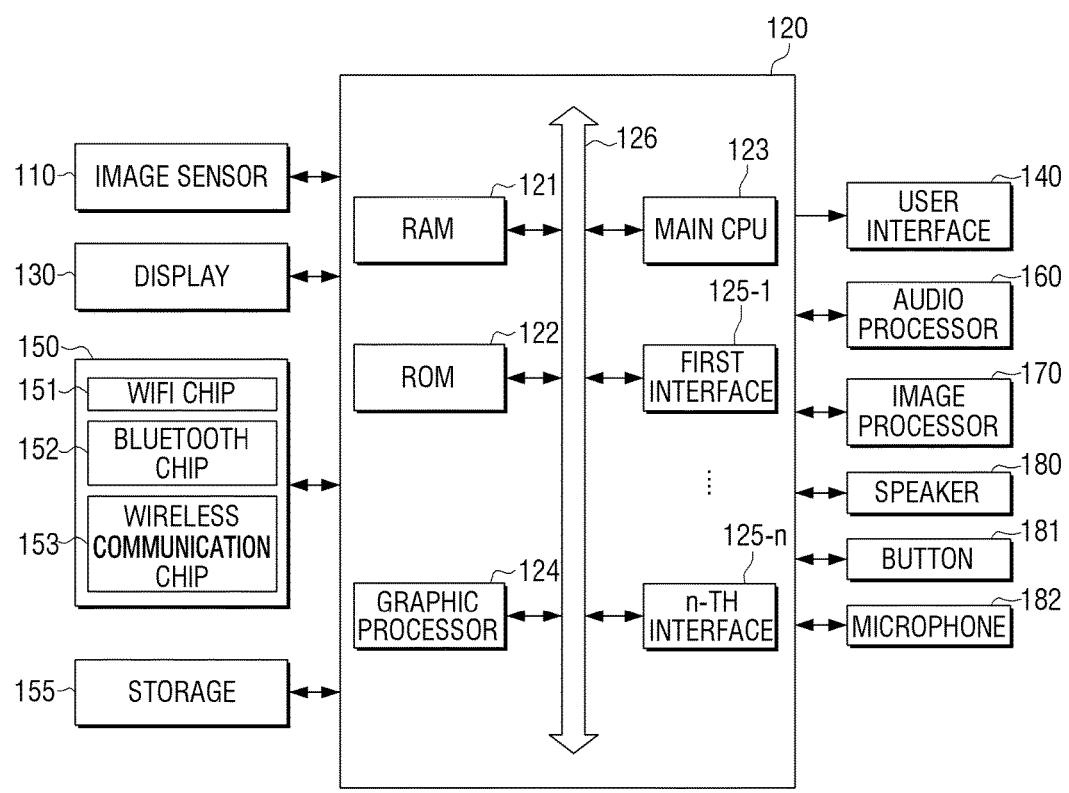

FIGS. 3A and 3B are block diagrams illustrating the configuration of an imaging apparatus 100 according to an exemplary embodiment.

Referring to FIG. 3A, an imaging apparatus 100 includes an image sensor 110 and a processor 120. FIG. 3A illustrates only constituent elements that participate in operations according to various exemplary embodiments, and illustration of the remaining detailed constituent elements is omitted.

The image sensor 110 may include a plurality of image pixels that sense images through collection of light that is incident through a lens and a plurality of phase sensing pixels that sense phases. The image sensor 110 is composed of the image pixels that are arranged in most regions thereof and serves to sense the images. Further, in order to perform focusing on the basis of contrast auto focus and phase auto focus, the image sensor 110 may include the phase sensing pixels that are arranged at predetermined intervals among the image pixels. The details of the image sensor 110 will be described later.

The processor 120 controls the whole operation of the imaging apparatus 100.

In general, the processor 120 is a configuration that serves to control the apparatus, and may also be called a central processing unit, a microprocessor, or a controller to control the whole operation of the apparatus. The processor 120 may be implemented as a single chip system, for example, System-On-a-Chip (SoC), together with another functional constituent element, such as a communicator.

The processor 120 may divide a region of interest of the image sensor into a plurality of sub-regions of interest, calculate disparity information of objects that correspond to the plurality of sub-regions of interest using the phase sensing pixels included in the plurality of sub-regions of interest, and determine a focal region in the region of interest on the basis of the disparity information.

Further, the processor 120 may determine the focal region in the region of interest through calculation of a movement distance and reliability information of the lens corresponding to a position of the lens on the basis of the disparity information. The lens may move back and forth toward a focal plane of the image sensor 119, and the processor 120 may measure a position of the lens from a reference point to calculate the movement distance of the lens. The processor 120 may obtain the reliability information by measuring depth map sequences of a captured image and assessing a peak signal-to-noise ratio (PSNR) of the depth map sequences.

The processor 120 may divide the region of interest into a first pair of the center sub-region of interest and the peripheral sub-region of interest, a second pair of the left sub-region of interest and the right sub-region of interest, and a third pair of the upper sub-region of interest and the lower sub-region of interest.

Further, the processor 120 may calculate movement distances of the lens to perform focusing with respect to the sub-regions of interest that are included in the first to third pairs, determine the pairs having the greatest difference between the movement distances of the lens among the first to third pairs, and determine one of the sub-regions of interest of the pairs having the greatest difference between the movement distances of the lens as the focal region.

The imaging apparatus 100 may further include a display and a user interface receiving a user input. The processor 120 controls the display to display a user interface (UI) that indicates the pairs having the greatest difference between the movement distances of the lens, and if the user input for selecting one of the pairs having the greatest difference between the movement distances of the lens is input, the processor 120 determines the selected sub-region of interest as the focal region.

The processor 120 may determine the focal region in the region of interest by dividing the region of interest into M rows and N columns having the same size and grouping adjacent sub-regions of interest if the difference between the movement distances of the lens with respect to the adjacent sub-regions of interest is equal to or smaller than a predetermined size.

Further, the processor 120 may determine one of a group having the shortest distance to the object, a group having the highest reliability, and a group having the largest number of grouped sub-regions of interest as the focal region.

Further, the processor 120 may perform grouping of only the sub-regions of interest having reliability that is higher than a predetermined reliability.

Here, the movement distance of the lens may be information which is determined from the disparity information that is calculated through phase auto focus with respect to the position of the lens on the basis of the movement distances of the lens measured through contrast auto focus to perform focusing.

The processor 120 may sense the images using the two phase sensing pixels that correspond to the plurality of sub-regions of interest, and calculate the disparity information through cross-correlation of the two images.

FIG. 3B is a block diagram illustrating the detailed configuration of an imaging apparatus 100' according to another exemplary embodiment. Referring to FIG. 3B, the imaging apparatus 100' includes an image sensor 110, a processor 120, a display 130, a user interface 140, a communicator 150, a storage 155, an audio processor 160, an image processor 170, a speaker 180, a button 181, and a microphone 182. In FIG. 3B, the detailed explanation of the constituent elements illustrated in FIG. 3B, which overlap the constituent elements illustrated in FIG. 3A, will be omitted.

The processor 120 controls the whole operation of the imaging apparatus 100 using various kinds of programs stored in the storage 155.

Specifically, the processor 120 includes a random-access memory (RAM) 121, a read-only memory (ROM) 122, a main central processing unit (CPU) 123, a graphic processor 124, first to n-th interfaces 125-1 to 125-n, and a bus 126.

The RAM 121, the ROM 122, the main CPU 123, the graphic processor 124, and the first to n-th interfaces 125-1 to 125-n may be connected to one another through the bus 126.

The first to n-th interfaces 125-1 to 125-n are connected to the various kinds of constituent elements as described above. One of the interfaces may be a network interface that is connected to an external device through a network.

The main CPU 123 accesses the storage 155, and performs booting using the operating system (OS) stored in the storage 155. Further, the main CPU 123 performs various operations using various kinds of programs stored in the storage 155.

In the ROM 122, a command set for system booting is stored. If a turn-on command is input and a power is supplied, the main CPU 123 copies the OS stored in the storage 155 into the RAM 121 according to the command stored in the ROM 122, and boots the system through execution of the OS. If the booting is completed, the main CPU 123 copies various kinds of application programs stored in the storage 155 into the RAM 121, and performs various kinds of operations through execution of the application programs copied into the RAM 121.

The graphic processor 124 generates a screen that includes various objects, such as icons, images, and texts, using an operator and a renderer. The operator operates attribute values, such as coordinate values, shapes, sizes, and colors of the respective objects to be displayed according to the layout of the screen on the basis of a received control command. The renderer generates a screen of various layouts including the objects on the basis of the attribute values operated by the operator. The screen that is generated by the renderer is displayed in a display region of the display 130.

On the other hand, the operation of the processor 120 as described above may be performed by programs stored in the storage 155.

The storage 155 may store therein various kinds of data, such as an OS software module for driving the imaging apparatus 100, movement distance information and reliability information of a lens corresponding to the disparity information, information about a method for dividing a region of interest, and UI information to be provided to a user.

In this case, the processor 120 may display setting information of a focal region, adjustment of a lens position to perform focusing, and various UIs on the basis of the information stored in the storage 155.

The user interface 140 receives various user interactions. Here, the user interface 140 may be implemented in various forms in accordance with implementation examples of the imaging apparatus 100. For example, the user interface 140 can be implemented by a remote control receiver that receives a remote control signal from a remote controller and a microphone that receives user voice. Further, in the case where the imaging apparatus 100 is implemented by a touch-based portable terminal, the user interface 140 may be implemented in the form of a touch screen that forms a mutual layer structure with a touchpad. In this case, the user interface 140 may be used as the display 130 as described above.

The audio processor 160 is a constituent element that processes audio data. The audio processor 160 may perform various processes, such as audio data decoding, amplification, and noise filtering.

The video processor 170 is a constituent element that processes video data. The video processor 170 may perform various image processes, such as video data decoding, scaling, noise filtering, frame rate conversion, and resolution conversion.

The speaker 180 is a constituent element that outputs not only various kinds of audio data processed by the audio processor 160 but also various kinds of notification sound or voice messages.

The button 181 may be one of various types of buttons, such as a mechanical button, a touchpad 210, or a wheel, which is formed on a certain region, such as a front, side, or rear portion of a main body of the imaging apparatus 100.

The microphone 182 is a constituent element that receives an input of user voice or other sound and converts the input voice into audio data. The microphone 182 may generate a control signal from the user voice.

Figure 4:
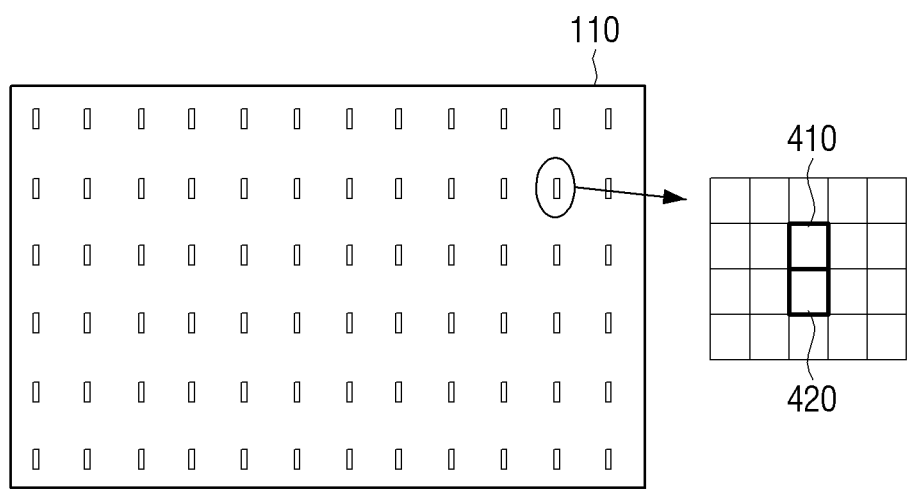
FIG. 4 is a diagram explaining an image sensor according to an exemplary embodiment.

FIG. 4 is a diagram explaining an image sensor 110 according to an exemplary embodiment.

Referring to FIG. 4, the image sensor 110 may include a plurality of image pixels and a plurality of phase sensing pixels 410 and 420. The image sensor 110 may be composed of the image pixels arranged in most regions of the image sensor 110, and the image pixels may sense images through collection of light that is incident through the lens. FIG. 4 illustrates that phase difference detection pixels are arranged at predetermined intervals. However, this is for convenience in explanation, and the image pixels may be arranged in all regions of the image sensor 110 except for the phase sensing pixels.

The plurality of phase sensing pixels 410 and 420 are arranged at predetermined intervals between the image pixels to sense phases of objects. FIG. 4 illustrates an enlarged view of a plurality of pixel regions positioned on the upper right side of the image sensor 110, and the remainders of the plurality of pixel regions except for the plurality of phase sensing pixels 410 and 420 may be the image pixels.

The plurality of phase sensing pixels are arranged at predetermined intervals as shown in FIG. 4, and even if a user determines any part of the image sensor 110 as the focal region, the focus using the phase auto focus can be set using the plurality of phase sensing pixels corresponding to the focal region. The intervals of the phase sensing pixels as illustrated in FIG. 4 are merely exemplary, and the phase sensing pixels may be arranged at narrower or wider intervals.

On the other hand, a method for setting a focus using the phase sensing pixels will be described later.

Figure 5:
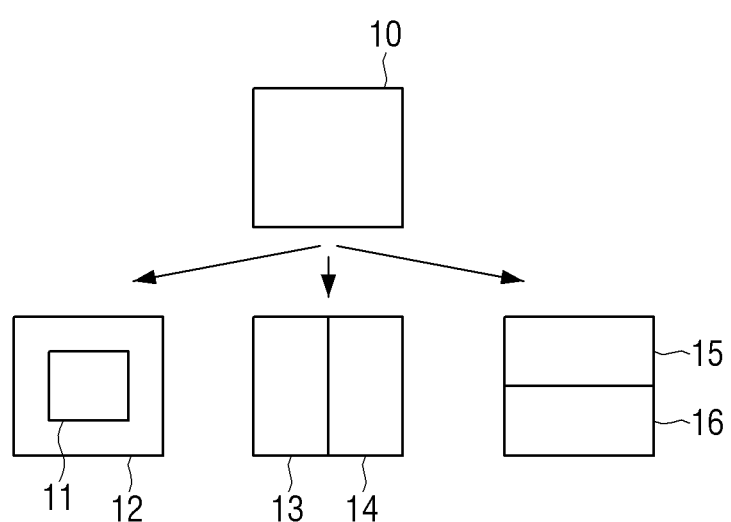
FIG. 5 is a diagram explaining a method for determining a focal region through division of a region of interest according to an exemplary embodiment.

FIG. 5 is a diagram explaining a method for determining a focal region through division of a region of interest according to an exemplary embodiment.

Referring to FIG. 5, the processor 120 may divide a region 10 of interest of the image sensor 110 into a plurality of sub-regions of interest. Here, the region 10 of interest may be the whole or a part of the image sensor 110. FIG. 5 illustrates that the region 10 of interest is a part of the image sensor 110. A case where the region 10 of interest is the whole of the image sensor 110 will be described later.

The processor 120 may divide the region 10 of interest into the first pair composed of the center sub-region 11 of interest and the peripheral sub-region 12 of interest of the region 10 of interest, the second pair composed of the left sub-region 13 of interest and the right sub-region 14 of interest of the region 10 of interest, and the third pair composed of the upper sub-region 15 of interest and the lower sub-region 16 of interest of the region 10 of interest. However, this is merely exemplary, and the processor 120 may divide the region 10 of interest into sub-regions of interest so that the respective sub-regions of interest do not overlap one another.

The processor 120 may calculate the disparity information of the objects that correspond to the plurality of sub-regions of interest using the phase sensing pixels included in the plurality of sub-regions of interest. The disparity information indicates a phase difference between the objects measured by the plurality of phase sensing pixels. For example, the processor 120 may calculate the disparity information using the phase sensing pixels corresponding to the center sub-region 11 of interest. In this case, at least two phase sensing pixels correspond to the center sub-region 11 of interest. The disparity information may be calculated by performing cross-correlation of an image that is generated by the first phase sensing pixels corresponding to the center sub-region 11 of interest and an image that is generated by the second phase sensing pixels.

The processor 120 may determine the focal region in the region of interest on the basis of the disparity information. For example, the processor 120 may calculate the movement distances of the lens to perform focusing with respect to the sub-regions 11 to 16 of interest that are included in the first to third pairs, determine the pairs having the greatest difference between the movement distances of the lens among the first to third pairs, and determine one of the sub-regions of interest of the pairs having the greatest difference between the movement distances of the lens as the focal region. A method for calculating the movement distances of the lens from the disparity information will be described with reference to FIGS. 6A and 6B.

The processor 120 may determine which one of the first to third pairs has the greatest difference between the movement distances of the lens. For example, the movement distance of the left sub-region 13 of interest may be −100 codes from the current position of the lens, and the movement distance of the right sub-region 14 of interest may be 100 codes from the current position of the lens. In this case, the difference of the lens movement distances between the two sub-regions 13 and 14 of the second pair may be 200 codes. Here, the term "code" is a unit for indicating the position of the lens. In the case where the difference between the movement distances of the lens of the first pair is 100 codes and the difference between the movement distances of the lens of the third pair is 134 codes, the processor 120 may determine that the difference between the movement distances of the lens of the second pair is greatest, and determine any one of the left sub-region 13 of interest and the right sub-region 14 of interest as the focal region.

In this case, the greatest difference between the movement distances of the lens means that the object that is positioned in one of sub-regions of interest of one pair is nearby and the object that is positioned in the other of sub-regions of interest of the pair is far off, and this is called far-near rivalry. The processor 120 may select one of sub-regions of interest of the pair having the far-near rivalry. However, this is merely exemplary, and it is also possible to determine one of sub-regions of interest of the pair having the smallest difference between the movement distances of the lens as the focal region.

The processor 120 may determine the sub-region of interest of the pair having the greatest difference between the movement distances of the lens, in which the object is positioned nearby, as the focal region. The lens position may be in the range of about 0 to 500 codes. As the lens position becomes near to 0 code, the object that is far off is focused, and as the lens position becomes close to 500 codes, the nearby object is focused. Using the above-described characteristics, the processor 120 can determine the sub-region of interest in which the object is positioned nearby. However, this is merely exemplary, and the processor 120 may also determine the sub-region of interest in which the object is positioned far off.

Figure 6A:
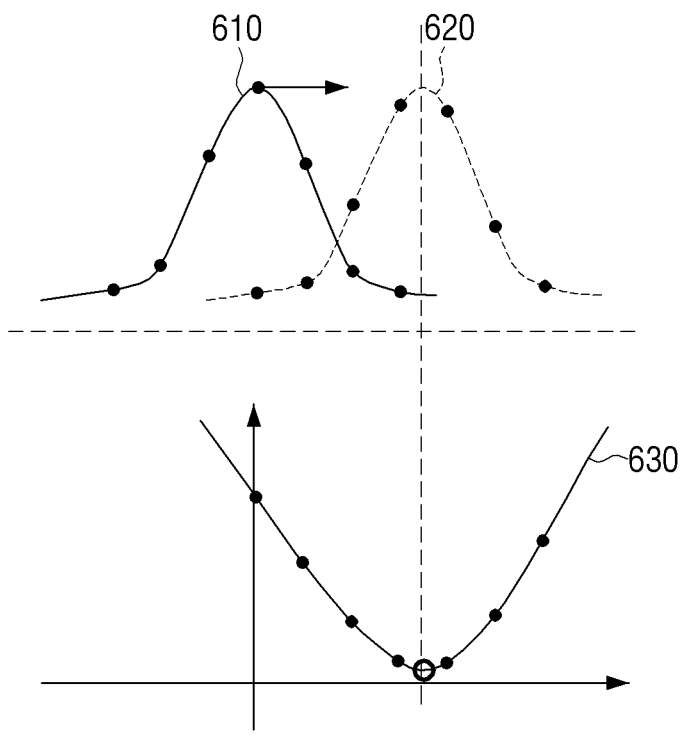
FIGS. 6A and 6B are diagrams explaining a method for calculating movement distances of a lens from disparity information according to an exemplary embodiment.
Figure 6B:
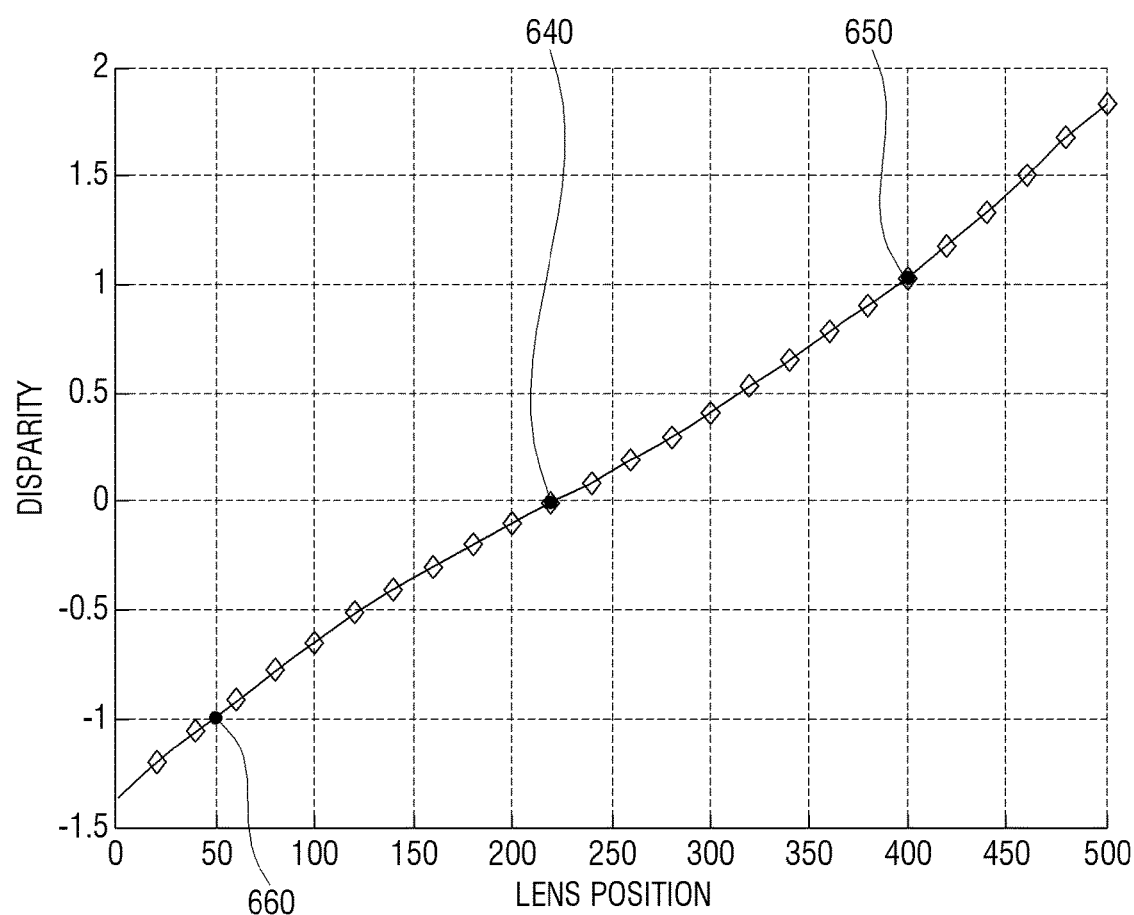

FIGS. 6A and 6B are diagrams explaining a method for calculating movement distances of a lens from disparity information according to an exemplary embodiment.

Referring to FIG. 6A, pixel distribution may be determined using a plurality of phase sensing pixels. For example, the pixel distribution through the first phase sensing pixels may be shown on a left-side graph 610, and the pixel distribution through the second phase sensing pixels may be shown on a right-side graph 620.

The processor 120 may sense the images using the two phase sensing pixels that correspond to the plurality of sub-regions of interest, and calculate the disparity information through cross-correlation of the two images. The result of the cross-correlation of the two images is shown in the second drawing of FIG. 6A, which is in the form of a downward convex parabola.

Referring to FIG. 6B, the processor 120 may store disparity information of specific objects in the storage 155. A point 640, at which the disparity value is 0, is a point at which the phase difference between the images sensed using two phase sensing pixels is 0, and in this case, it is not required to move the lens. A point 650, at which the disparity value is 1, is a point at which the phase difference between the images is 1, and in this case, the lens position is 400 codes. A point 660, at which the disparity value is −1, is a point at which the phase difference between the images is −1, and in this case, the lens position is 50 codes.

The storage 155 may store movement distance information of the lens corresponding to the objects on the basis of the disparity information. Such information is affected by the lens position, color temperature, and iris value. A method for calculating movement distance information of a lens that reflects such external factors will be described later.

Figure 7:
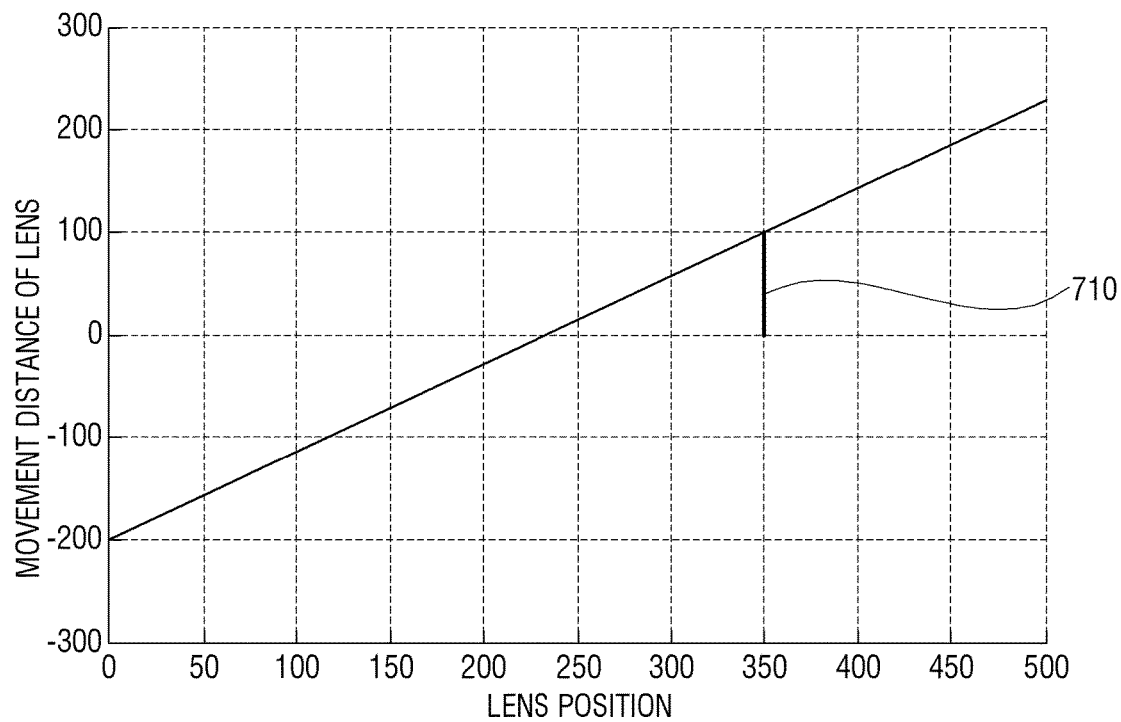
FIGS. 7 and 8 are diagrams explaining a method for calculating movement distance and reliability information of a lens to perform focusing according to an exemplary embodiment.
Figure 8:
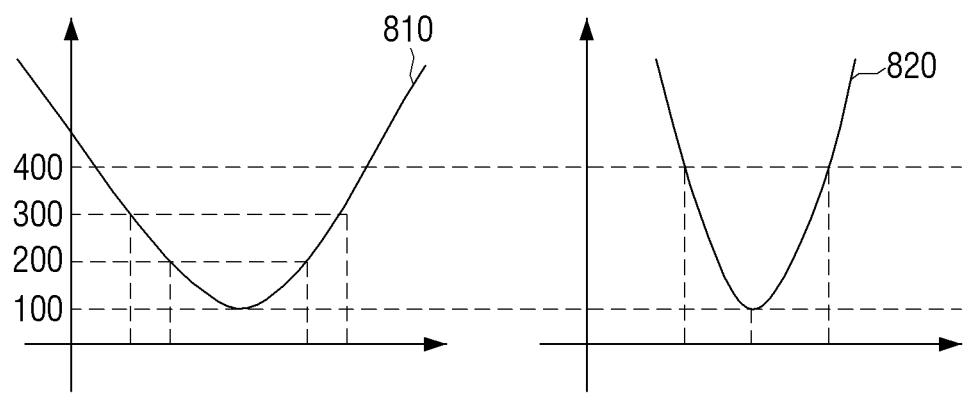

FIGS. 7 and 8 are diagrams explaining a method for calculating movement distance and reliability information of a lens to perform focusing according to an exemplary embodiment.

The processor 120 may determine the focal region in the region 10 of interest through calculation of the movement distance and reliability information of the lens corresponding to the lens position on the basis of the disparity information. The method for determining the focal region in the region 10 of interest using the movement distance of the lens has been described, and a method for determining the focal region in the region 10 of interest through calculation of the reliability information will be described later.

Referring to FIG. 7, the movement distance of the lens corresponding to the lens position can be known. Such information may be stored in the storage 155, and the processor 120 can perform focusing through movement of the lens position on the basis of the information stored in the storage 155. In FIG. 7, in the case where the current lens position is 350 codes, the movement distance of the lens may be a y value 710 of the graph.

The movement distance of the lens may correspond to the disparity information. For example, the movement distance of the lens may be in direct proportion to the disparity information. However, this is merely exemplary, and the movement distance of the lens may be calculated on the basis of the disparity information, but may not be in direct proportion to the disparity information.

Referring to FIG. 8, the processor 120 may calculate the reliability information using the result of the cross-correlation. The processor 120 may consider the value of the lowermost point of the cross-correlation curve as a noise and a specific point that is adjacent to the lowermost point as a signal, and calculate the signal to noise (S/N) ratio as the reliability.

For example, the processor 120 may consider the value "100" of the lowermost point of the first cross-correlation curve 810 on the left-side drawing of FIG. 8 as a noise, and consider the value "200" of the specific point that is adjacent to the lowermost point as a signal. The S/N ratio of the first cross-correlation curve 810 may be calculated as (200−100)/100=1.

In the same manner, the processor 120 may consider the value "100" of the lowermost point of the second cross-correlation curve 820 on the right-side drawing of FIG. 8 as a noise, and consider the value "400" of the specific point that is adjacent to the lowermost point as a signal. The S/N ratio of the second cross-correlation curve 820 may be calculated as (400−100)/100=3.

The processor 120 may determine that the second cross-correlation curve 820, of which the S/N ratio is calculated as 3, has high reliability. In this case, the specific point that is adjacent to the lowermost point may be determined as a point that is apart from the x-axis value of the lowermost point for the same distance. A method for setting a focal region in a region 10 of interest from the reliability information will be described later.

Figure 9:
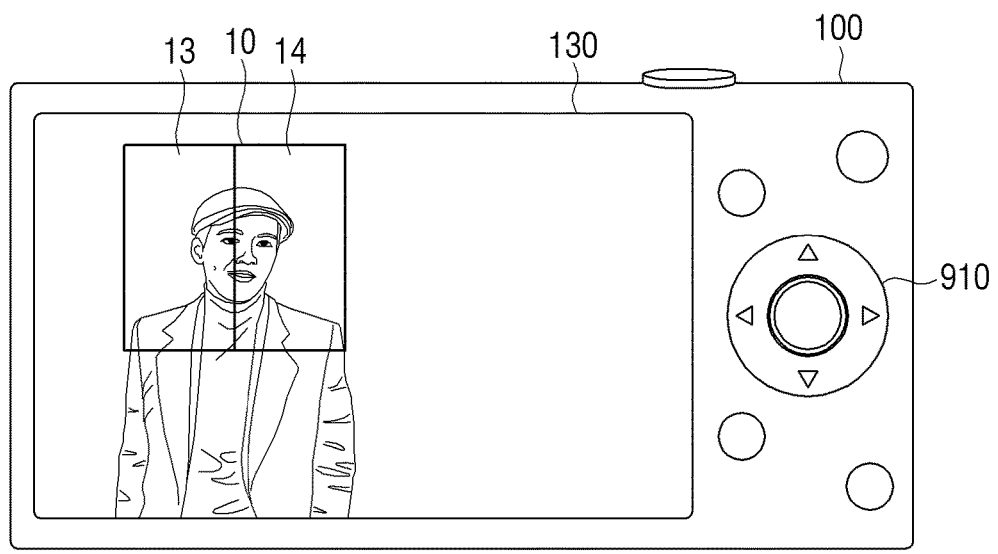
FIG. 9 is a diagram explaining a method for designating a region of interest according to an exemplary embodiment.

FIG. 9 is a diagram explaining a method for designating a region of interest according to an exemplary embodiment.

Referring to FIG. 9, the imaging apparatus may further include a display 130. A region 10 of interest and an image in accordance with light that is input through a lens may be displayed on the display 130.

The region 10 of interest may be designated by a user or may be applied in the same manner when the previously determined region 10 of interest is used thereafter, but is not limited thereto. An initially set region 10 of interest may be continuously used, or the region 10 of interest may be automatically set to surround a human face after the human face is recognized.

In the case where a user designates the region 10 of interest, the user may set the specific region through touching of a touch screen. In this case, the display 130 may be a touch screen. In the case of setting the region 10 of interest using the touch screen, the user may draw a rectangular trace on the touch screen, or may set the region 10 of interest through touching of two specific points. Further, it is also possible to change the size of the region 10 of interest of a specific shape in accordance with user's touch time, and the region 10 of interest may be set in other various methods.

Further, the user may designate the region 10 of interest using a button 910. The user may move the region 10 of interest of a predetermined size using the button 910. The size of the region 10 of interest may be changed through an operation to press the button 910 twice consecutively. For example, in the case of pressing the right button twice consecutively, the right side of the region 10 of interest is moved to change the size of the region 10 of interest. FIG. 9 illustrates that the button 910 is a four-direction button, but is not limited thereto. A joystick button may be provided instead. Further, the region 10 of interest is in a rectangular shape, but is not limited thereto. The region 10 of interest may be in a circular or triangular shape.

The user may not only designate the region 10 of interest but also determine the focal region. For example, the processor 120 may control the display 130 to display a UI that indicates the pair having the greatest difference between the movement distances of the lens. Referring to FIG. 9, the processor 120 may display a left sub-region 13 of interest and a right sub-region 14 of interest. Further, if a user input to select one of the pairs having the greatest difference between the movement distances of the lens is received, the processor 120 may determine the selected sub-region of interest as the focal region. As described above, selection of the focal region can be performed through user's touch or button input.

Figure 10A:
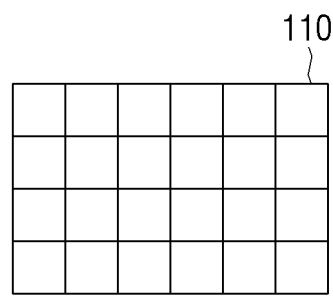
Figure 10B:
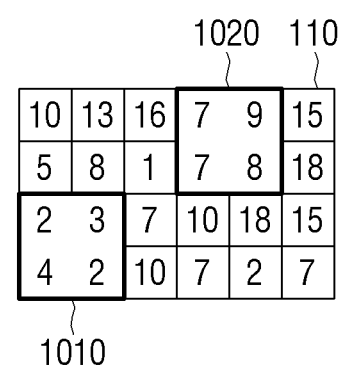

FIGS. 10A and 10B are diagrams explaining a method for determining a focal region in the case where a region 10 of interest is a whole image sensor 110 according to an exemplary embodiment.

Referring to FIG. 10A, the processor 120 may divide the region 10 of interest into M rows and N columns having the same size, but is not limited thereto. The divided rows and columns may not have the same size, but may have various shapes except for a rectangle. Further, FIG. 10A illustrates that the divided regions do not overlap one another, but are not limited thereto. As illustrated in FIG. 5, the region 10 of interest may be divided to include pairs that overlap each other.

Referring to FIG. 10B, the processor 120 may calculate the movement distances of the lens with respect to the sub-regions of interest. Since the method for calculating the movement distances of the lens with respect to the regions has been described, the duplicate explanation thereof will be omitted.

Further, if the difference between the movement distances of the lens with respect to adjacent sub-regions of interest is equal to or smaller than a predetermined value, the processor 120 may determine the focal region in the region of interest by grouping the adjacent sub-regions of interest. For example, a first group region 1010 and a second group region 1020 indicate grouped regions in the case where the difference between the movement distances is equal to or smaller than 3. FIG. 10B schematically illustrates the movement distances of the lens to explain the grouping. However, the movement distances may have different values without limit. Further, although it is assumed that the difference between the movement distances is equal to or smaller than 2, the difference between the movement distances may have any other value that is determined by the user.

Further, the processor 120 may perform grouping of only the sub-regions of interest having reliability that is higher than a predetermined reliability.

The processor 120 may determine one of a group having the shortest distance to the object, a group having the highest reliability, and a group having the largest number of grouped sub-regions of interest as the focal region.

In the case of the group having the shortest distance to the object, the processor 120 may determine the focal region through averaging of the lens movement distances of the grouped sub-regions of interest. Since the distance to the object has been described, the duplicate explanation thereof will be omitted. However, the distance to the object is not limited thereto, and a group having the longest distance to the object may be selected. Further, the sub-regions of interest are not limited to grouping, and one of non-grouped sub-regions of interest may be selected.

In the case of the group having the highest reliability, the determination of the focal region is performed in a similar manner. The reliability calculation has been described, and the reliability of a specific group may be obtained using the average value as described above. Further, the sub-regions of interest are not limited to grouping, and one of non-grouped sub-regions of interest may be selected.

In the case of the group having the largest number of grouped sub-regions of interest, the processor 120 may determine the focal region through grasping of the number of sub-regions of interest of each group, but is not limited thereto. It is also possible to select the group having the specific number of grouped sub-regions of interest. Further, if there are several groups having the same number of sub-regions of interest, the processor 120 may determine the focal region using one of the group having the shortest distance to the object and the group having the highest reliability among the several groups.

Figure 11:
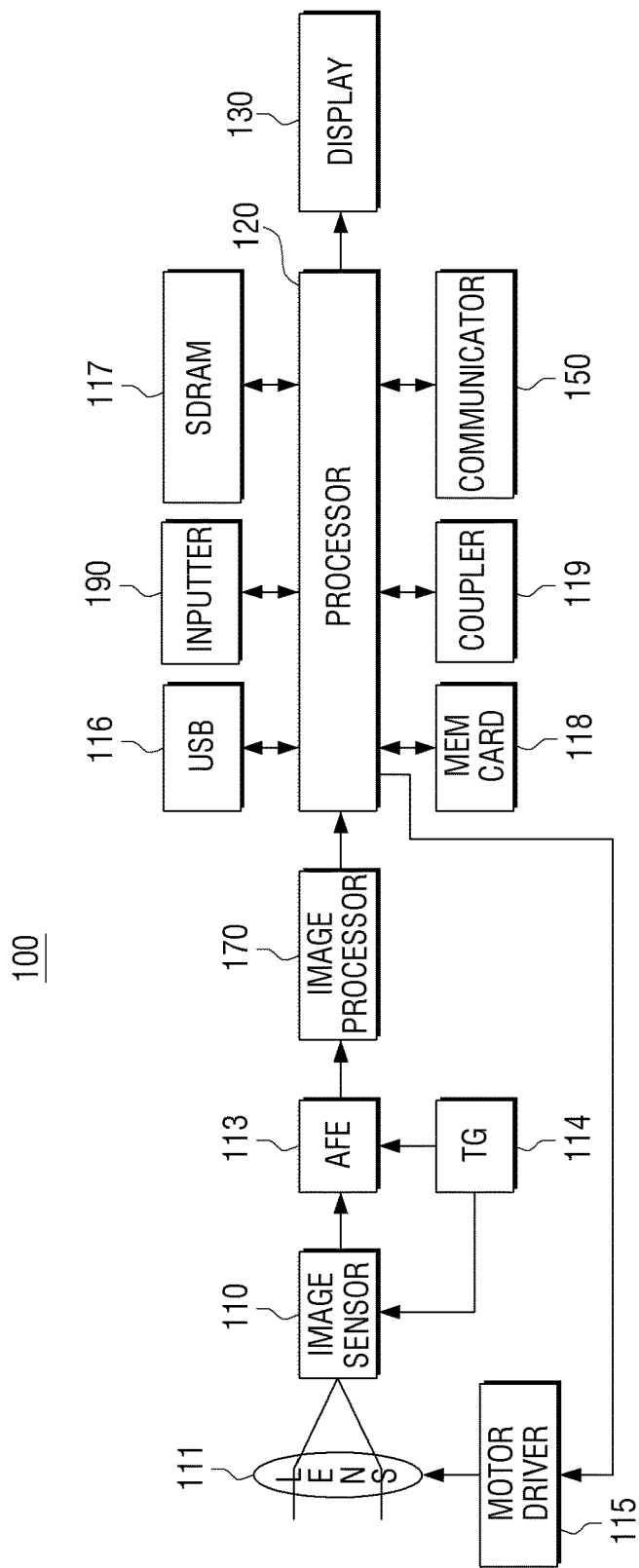
FIG. 11 is a block diagram illustrating the circuit configuration of an imaging apparatus according to an exemplary embodiment.

FIG. 11 is a block diagram illustrating the circuit configuration of an imaging apparatus 100 according to an exemplary embodiment.

Referring to FIG. 11, an imaging apparatus 100 includes a lens 111, an image sensor 110, a time generator (TG) 114, an analog front end (AFE) 113, a motor driver 115, a coupler 119, an inputter 190, an image processor 170, a communicator 150, a processor 120, a display 130, a synchronous dynamic random access memory (SDRAM) module 117, a memory card 118, and a universal serial bus (USB) module 116.

The lens 111 is a constituent element to which light that is reflected from an object is incident, and includes a short focusing lens. Although not illustrated in the drawing, the imaging apparatus 100 may further include an iris.

The iris is a constituent element that adjusts the quantity of light which passes through the lens 111 and is incident to the image sensor. The iris has a mechanical structure that may gradually increase or decrease the size of an opening so as to adjust the quantity of the incident light. The iris indicates the degree of opening with an iris value that is called an F value. Since the size of opening becomes larger as the iris value becomes smaller, the quantity of the incident light becomes larger, and thus a brighter image can be generated.

The image sensor 110 is a constituent element that forms an image of an object that has passed through the lens 111. The image sensor 110 includes a plurality of pixels that are arranged in the form of a matrix. Each of the plurality of pixels accumulates photo-charge in accordance with the incident light, and outputs an image in accordance with the photo-charge as an electrical signal. The image sensor 110 may be composed of complementary metal oxide semiconductor (CMOS) or charge coupled device (CCD).

Further, the image sensor 110 may include a photodiode PD, a transmission transistor TX, a reset transistor RX, and a floating diffusion node FD. The photodiode PD generates and accumulates photo-charge that corresponds to an optical image of the object. The transmission transistor TX transmits the photo-charge that is generated in the photodiode PD to the floating diffusion node FD in response to a transmission signal. The reset transistor RX discharges charge that is stored in the floating diffusion node FD in response to a reset signal. The charge that is stored in the floating diffusion node FD is output before the reset signal is applied, and in the case of a CDS image sensor, correlated double sampling (CDS) is performed. Thereafter, an ADC converts a CDS-processed analog signal into a digital signal.

The TG 114 outputs a timing signal to read out pixel data of the image sensor 110. The TG 114 is controlled by the processor 120.

The AFE 113 digitalizes the electrical signal of the object image that is output from the image sensor 110 through sampling. The AFE 113 is controlled by the processor 112.

However, other constituent elements may replace the AFE 113 and the TG 114. Particularly, in the case where the image sensor 110 is implemented in a CMOS type, such constituent elements may be unnecessary.

The motor driver 115 performs focusing through driving of the focusing lens on the basis of information that is calculated through readout of the phase difference pixels. However, in the case where the imaging apparatus 100 is implemented by a smart phone or a cellular phone, the focusing may be performed by software without driving the focusing lens, and in this case, the motor driver 115 may not be provided.

The image processor 170 processes raw image data under the control of the processor 120, and records the processed image data in the SDRAM 117. Further, the image processor 170 transfers the image data recorded in the SDRAM 117 to the display 130.

In the case of performing auto focusing using the phase difference, the image processor 170 separates a signal for generating an image (signal read out from general pixels) and a signal for calculating the phase difference (signal read out from phase difference pixels) from the signal which is output from the image sensor 110 and is sampled by the AFE 113.

The image processor 170 processes the raw image data to convert the raw image data into YCbCr data. First, pixel defect of the raw image data is corrected by a correction circuit. The correction circuit corrects the pixel defect with reference to a correction table in which addresses of defective pixels are registered. Correction of the pixels that coincide with the registered addresses is performed using the surrounding pixels.

The image processor 170 includes an optical black (OB) clamp circuit that determines a black level of an image. The image sensor 110 having an OB region detects an average value of a signal in the OB region and determines the black level through the difference between the respective pixel values.

Further, the image processor 170 adjusts sensitivity ratio that differs by colors using a sensitivity ratio adjustment circuit. The sensitivity ratio adjustment circuit adjusts the sensitivities of red (R), green (G), and blue (B) colors under a standard light source. Typically, the sensitivity ratio adjustment circuit fixes a gain value of G to 1, and matches the sensitivities of R and B with the fixed gain value.

In the case of outputting a still image, the image processor outputs image data through an output buffer after adjustment of the sensitivity ratio. In this case, the image is generated in an interlace method, and thus it is not possible to immediately perform post-processing. In contrast, in the case of outputting a live-view image, the image is generated in a progressive method, and thus it is possible to immediately perform post-processing.

Further, the image processor 170 performs skip readout using a horizontal skip readout circuit to read out a part of pixel lines and to skip the remaining pixel lines, and thus the number of pixels of the raw image is decreased.

The image processor 170 controls white balance (WB) of the image data using a WB control circuit. Since spectral distribution of illumination light differs depending on the imaging environment, a captured image of a white object may not be displayed white. Different gain values are given to the R, G, and B pixels to match signal levels.

Further, the image processor 170 performs gamma correction with respect to the image data. Through the gamma correction, grayscale conversion is performed to match the output of the display 130.

Further, the image processor 170 generates a typical color image signal composed of three colors for one pixel from one-color Bayer signal for one pixel using a color interpolation circuit.

Further, the image processor 170 performs color space conversion and color correction to match the output using a color conversion/color correction circuit. If needed, a look-up table (LUT) may be used. The image data becomes YCbCr data after the color conversion/color correction.

The image processor 170 converts resolutions to match the size using a resolution conversion circuit.

The image processor 170 processes a spatial filter with respect to the image data using a spatial filter circuit. The image processor 170 performs edge enhancement of Y signal, and performs low pass filter (LPF) process of Cb/Cr signal.

Further, the image processor 170 performs skip readout with respect to the Cb/Cr signal using a CbCr skip readout circuit to convert the CbCr signal into image data of YCbCr4:2:2. The image data is output through an output buffer and is recorded in the SDRAM 117 through a bus.

In the case of a still image, the readout may be performed in the interlace method. In this case, an adjacent pixel line does not exist, and thus it is not possible to perform direct color interpolation. Accordingly, after preprocessing, the image processor 170 stores the image in the SDRAM 117 in the progressive method through control of the pixel line order through the output buffer.

However, in an exemplary embodiment, readout of the still image is not limited to the interlace method, but the readout may be implemented in the progressive method.

On the other hand, in the case of the still image, it is not required to generate a small preview image or a thumbnail image after the imaging. That is, like the skip readout, such an image is prepared with a part of pixel data omitted.

The image processor 170 interpolates the phase difference pixel portion with general pixel values using an audio frequency (AF) signal interpolation circuit. Since the phase difference pixel is positioned between general pixels, resolution deterioration may occur, and thus the interpolation is performed using surrounding general pixels.

Based on the processing of the image processor 170 as described above, the image processor 170 may control the attribute of the remaining image in the same manner on the basis of the attribute of one of a plurality of images that are acquired through the imaging apparatus 100 under the control of the processor 120.

On the other hand, the phase difference pixel signals that are separated by a separation circuit are first recorded in the SDRAM 117 through a first bus. Since the readout and the separation are performed with respect to the whole pixels, the respective phase difference pixel signals are accumulated in the SDRAM 117 for a short period.

The stored phase difference pixel signals are input to a phase difference operation circuit through a first bus. The phase difference operation circuit operates the phase difference between the phase difference pixels and calculates movement direction and movement amount of the focusing lens. The calculated movement amount is temporarily recorded in a register of the phase difference operation circuit, and is read out by the processor (i.e., CPU) 120.

The processor 120 reads out the calculated movement amount of the focusing lens and generates a control command. The processor 120 transfers the generated control command to the motor driver 115 to drive the focusing lens.

JPEG codec compresses the YCbCr data, and the compressed image data is recorded in the SDRAM 117. The processor 120 reads out the compressed image data that is recorded in the SDRAM 117 and records the read compressed image data in the memory card 118 to complete the image generation procedure.

The communicator 150 is a constituent element that performs communication with another device. The communicator 150 may be implemented using various wireless communication technologies. The communicator 150 may mainly include a short-range communication module that performs direct communication without a relay device between devices.

The coupler 119 may be used to be fixed to another device through coupling, and wire communication may be performed through the coupler 119. A case where the coupler 119 is coupled to another device will be described later.

The communicator 150 may include at least one of a WiFi direct communication module, a Bluetooth module, an Infrared Data Association (IrDA) module, a near field communication (NFC) module, and a Zigbee module.

Application of other communication means is not excluded. For example, the communicator 150 may include any one of a cellular communication module, third generation (3G) communication module, fourth generation (4G) mobile communication module, and 4G Long Term Evolution (LTE) communication module.

The USB module 116 provides an interface with an external device. In the case where the USB module 116 is connected to a PC or another external device through a USB cable, it performs transmission/reception of the image data. Further, the USB module 116 performs firmware transmission/reception to perform firmware upgrade.

The inputter 190 is a constituent element that receives a user input. The inputter 190 may include at least one button. Further, the inputter 190 may include a touch screen that is positioned on the display 130.

The inputter 190 may receive not only an imaging command or an image capture command but also a user command for controlling magnification of a captured image.

An imaging magnification control command may be a user command through pressing of a button included in the imaging apparatus 100. For example, in the case where the inputter 190 includes an upper button and a lower button, if a user command is input through pressing of the upper button while a live-view is displayed, the live-view image may be enlarged.

Further, the inputter 190 may be implemented by a touch screen that receives a user command for controlling the magnification of the captured image through the display 130.

The SDRAM 117 is used to store images or to perform image work through the CPU. In an exemplary embodiment, a double data rate (DDR) SDRAM, which is configured to output data at both the rising edge and the falling edge of a system clock, may be used to improve twice the output in comparison to the SDRAM that is configured to output data only at the rising edge of the system clock.

The memory card 118 may be configured to include a flash memory, and may be implemented in the form of a card that is detachably mounted on the imaging apparatus 100. Further, the memory card 118 may store captured image files.

Figure 12A:
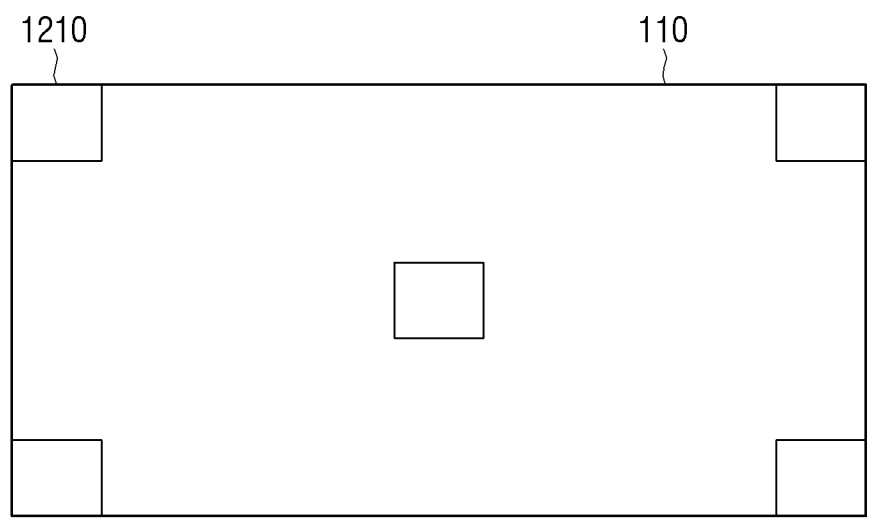
FIGS. 12A and 12B are diagrams explaining a method for correcting information about movement distances of a lens according to an exemplary embodiment.
Figure 12B:
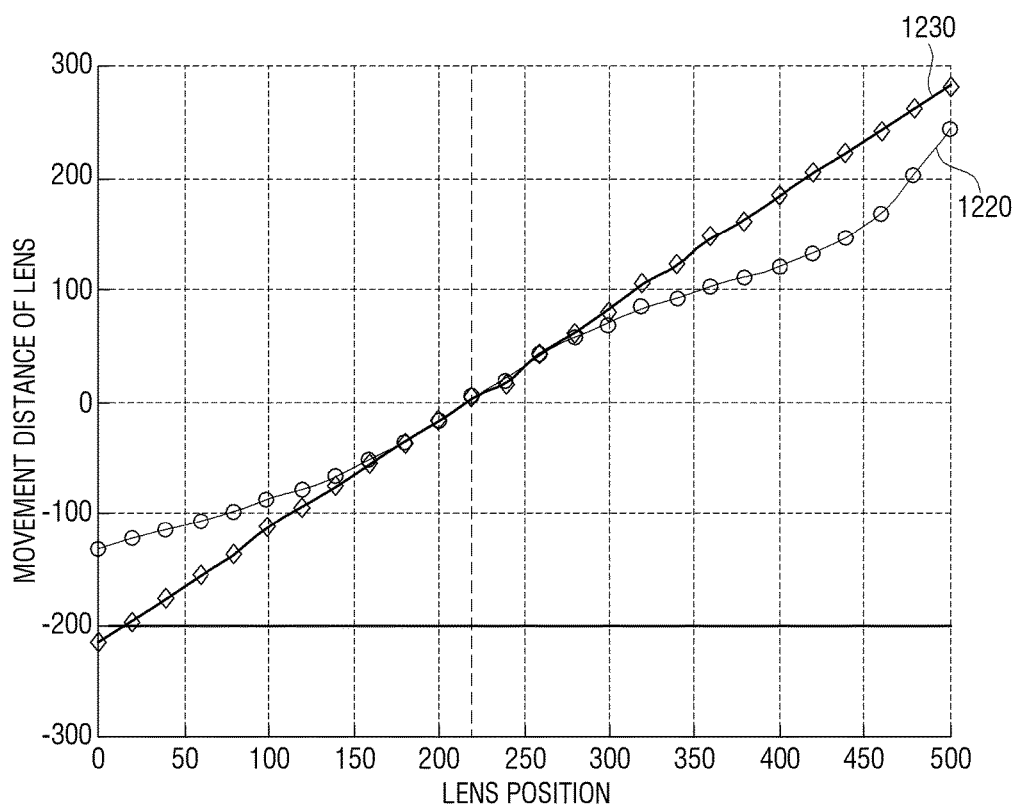

FIGS. 12A and 12B are diagrams explaining a method for correcting information about movement distances of a lens according to an exemplary embodiment.

Prior to explanation of the method illustrated in FIGS. 12A and 12B, it is assumed that the imaging apparatus 100 is an apparatus that uses both contrast auto focus and phase auto focus to perform focusing.

Further, the movement distance of a lens may be information which is determined from disparity information that is calculated through phase auto focus with respect to the lens position on the basis of the movement distance of the lens that is measured through contrast auto focus to match the focus.

As described above, the contrast auto focus has the drawback of low speed, and the phase auto focus has the drawback of inaccuracy in comparison to the contrast auto focus. Further, errors may occur in movement distance information of the lens that corresponds to an object on the basis of the disparity information in accordance with the lens position, the color temperature, and the iris value.

In the case where the processor 120 uses the phase auto focus to determine the focal region, the movement distance information of the lens corresponding to the object, which is obtained from the disparity information that is the result of the determination, is not linear, and thus correction is required. Such correction may be performed using the contrast auto focus. Specifically, accurate focus information of a specific object may be obtained with respect to a specific region of the image sensor 110 using the contrast auto focus, and the movement distance of the lens according to the lens position may be calculated. Further, the disparity information according to the phase auto focus may be correspondingly corrected on the basis of the calculated movement distance of the lens.

FIG. 12A illustrates specific regions of the image sensor 110, and particularly, a center region and four corner regions. It is required to perform correction with respect to the respective regions, but the specific regions are not limited to five regions. Further, the correction is required even in accordance with the position of the object in the respective regions. That is, the corrected movement distance information of the lens may be information that is corrected in accordance with the focal region and the position of the object.

FIG. 12B shows an example of the movement distance information of the lens with respect to the upper left corner 1210 of FIG. 12A. Before the correction is performed using the contrast auto focus, the first graph 1220 for the movement distance of the lens through the phase auto focus is not linear. This is because errors have occurred in accordance with the lens position, the color temperature, and the iris value. Such errors may exert influence separately or in complex. In addition to the above-described errors, various error causes may exist.

The second graph 1230 is a graph that is obtained by correcting the first graph 1220 using the contrast auto focus. The second graph 1230 shows the result that is almost linear with respect to the lens position. Such information may be stored in the storage 155.

That is, the imaging apparatus 100 is manufactured to store such information in the manufacturing process. In the case of using the phase auto focus to determine the focal region, the processor 120 calculates the movement distance of the lens corresponding to the disparity information on the basis of the stored information.

FIG. 13 is a flowchart explaining a method for controlling an imaging apparatus 100 according to an exemplary embodiment.

Referring to FIG. 13, first, a region of interest of an image sensor is divided into a plurality of sub-regions of interest (operation S1310). The region of interest may be the whole or a part of the image sensor, and may be determined by a user.

Then, disparity information of objects that correspond to the plurality of sub-regions of interest is calculated using phase sensing pixels included in the plurality of sub-regions of interest (operation S1320).

Then, a focal region in the region of interest is determined on the basis of the disparity information (operation S1330).

The determining the focal region (operation S1330) may include calculating movement distance and reliability information of the lens corresponding to a position of the lens on the basis of the disparity information; and determining the focal region in the region of interest using the movement distance and reliability information of the lens.

The dividing the region of interest into the plurality of sub-regions of interest (operation S1310) may divide the region of interest into a first pair of the center sub-region of interest and the peripheral sub-region of interest of the region of interest, a second pair of the left sub-region of interest and the right sub-region of interest of the region of interest, and a third pair of the upper sub-region of interest and the lower sub-region of interest of the region of interest.

Further, the determining the focal region (operation S1330) may include calculating movement distances of the lens to perform focusing with respect to the sub-regions of interest that are included in the first to third pairs, determining the pairs having the greatest difference between the movement distances of the lens among the first to third pairs, and determining one of the sub-regions of interest of the pairs having the greatest difference between the movement distances of the lens as the focal region.

The determining the focal region (operation S1330) may further include displaying a UI that indicates the pair having the greatest difference between the movement distances of the lens; receiving a user input for selecting one of the pairs having the greatest difference between the movement distances of the lens; and determining the selected sub-region of interest as the focal region.

Further, the dividing the region of interest into the plurality of sub-regions of interest (operation S1310) may include dividing the region of interest into M rows and N columns having the same size, and the determining the focal region (operation S1330) may include grouping of adjacent sub-regions of interest if the difference between the movement distances of the lens with respect to the adjacent sub-regions of interest is equal to or smaller than a predetermined size.

The determining the focal region (operation S1330) may include determining one of a group having the shortest distance to the object, a group having the highest reliability, and a group having the largest number of grouped sub-regions of interest as the focal region.

Further, the determining the focal region (operation S1330) may include grouping of only the sub-regions of interest having reliability that is higher than a predetermined reliability.

The movement distance of the lens may be information that is determined from the disparity information calculated through phase auto focus with respect to the position of the lens on the basis of the movement distances of the lens measured through the contrast auto focus to perform focusing.

The calculating the disparity information (operation S1320) may include sensing the images using the two phase sensing pixels that correspond to the plurality of sub-regions of interest, and calculating the disparity information through cross-correlation of the two images.

As described above, according to various exemplary embodiments, since the imaging apparatus calculates the information about the objects more promptly and automatically determines the focal region accordingly, user satisfaction can be improved.

On the other hand, the methods according to the various exemplary embodiments as described above may be programmed and stored in various kinds of storage media. Accordingly, the above-described methods according to various exemplary embodiments can be implemented in various types of electronic devices that execute the storage media.

While not restricted thereto, an exemplary embodiment can be embodied as computer-readable code on a computer-readable recording medium to perform a method including: dividing a region of interest of an image sensor into a plurality of sub-regions of interest, calculating disparity information of objects that correspond to the plurality of sub-regions of interest using phase sensing pixels included in the plurality of sub-regions of interest, and determining a focal region in the region of interest on the basis of the disparity information.

The computer-readable recording medium is any data storage device that can store data that can be thereafter read by a computer system. Examples of the computer-readable recording medium include read-only memory (ROM), random-access memory (RAM), CD-ROMs, digital versatile disc (DVD), hard disk, a Blu-ray disk, a USB memory, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An imaging apparatus comprising:
   an image sensor which includes a plurality of image pixels and a plurality of phase sensing pixels, and is configured to capture images through collection of light that is incident through a lens and the plurality of phase sensing pixels; and
   a processor configured to divide a region of interest of the image sensor into a plurality of sub-regions of interest, calculate disparity information of objects that correspond to the plurality of sub-regions of interest using at least one of the plurality of phase sensing pixels included in the plurality of sub-regions of interest, and determine a focal region in the region of interest based on the disparity information,
   wherein the processor is further configured to divide the region of interest into a center sub-region and a peripheral sub-region to form a first pair, divide into a left sub-region and a right sub-region to form a second pair, and divide into an upper sub-region and a lower sub-region to form a third pair.

2. The imaging apparatus as claimed in claim 1, wherein the processor is further configured to determine the focal region in the region of interest through calculation of a movement distance and reliability information of the lens corresponding to a position of the lens based on the disparity information.

3. The imaging apparatus as claimed in claim 1, wherein the processor is further configured to calculate movement distances of the lens to perform focusing with respect to the sub-regions of the first to third pairs, determine one of the pairs having the greatest difference between the movement distances of the lens among the first to third pairs, and determine one of the sub-regions of the pair having the greatest difference as the focal region.

4. The imaging apparatus as claimed in claim 3, further comprising:
   a display; and
   a user interface configured to receive a user input that selects the one of the pairs having the greatest difference,
   wherein the processor is further configured to control the display to display a user interface (UI) that indicates the pair having the greatest difference, and in response to the user input being recognized, determine one of the sub-regions of the selected pair as the focal region.

5. The imaging apparatus as claimed in claim 2, wherein the processor is further configured to determine the focal region in the region of interest by dividing the region of interest into M rows and N columns to obtain the plurality of sub-regions having the same size and grouping adjacent ones of the plurality of sub-regions in response to a difference between movement distances of the lens with respect to the adjacent sub-regions is equal to or smaller than a predetermined value.

6. The imaging apparatus as claimed in claim 5, wherein the plurality of sub-regions form at least one of a first group having the shortest distance to the object, a second group having the highest reliability, and a third group to which the largest number of sub-regions of interest belong, and
   wherein the processor is further configured to determine one of the first group, the second group, and the third group as the focal region.

7. The imaging apparatus as claimed in claim 5, wherein the processor is further configured to perform the grouping only with one or more of the plurality of sub-regions which have a reliability higher than a predetermined value.

8. The imaging apparatus as claimed in claim 2, wherein the movement distance of the lens is information that is determined from the disparity information calculated through phase auto focus with respect to the position of the lens.

9. The imaging apparatus as claimed in claim 1, wherein the processor is further configured to capture two of the images using two of the plurality of phase sensing pixels that correspond to the plurality of sub-regions of interest, and calculate the disparity information through cross-correlation of the two images.

10. A method for controlling an imaging apparatus provided with an image sensor that includes a plurality of image pixels and a plurality of phase sensing pixels and captures images through collection of light incident through a lens and the plurality of sensing pixels, the method comprising:
    dividing a region of interest of the image sensor into a plurality of sub-regions of interest;
    calculating disparity information of objects that correspond to the plurality of sub-regions of interest using at least one of the plurality of phase sensing pixels included in the plurality of sub-regions of interest; and
    determining a focal region in the region of interest based on the disparity information,
    wherein the dividing the region of interest into the plurality of sub-regions of interest comprises dividing the region of interest into a center sub-region and a peripheral sub-region to form a first pair, dividing into a left sub-region and a right sub-region to form a second pair, and dividing into an upper sub-region and lower sub-region to form a third pair.

11. The method for controlling the imaging apparatus as claimed in claim 10, wherein the determining the focal region comprises:

calculating a movement distance and reliability information of the lens corresponding to a position of the lens based on the disparity information; and determining the focal region in the region of interest using the movement distance and reliability information of the lens.

12. The method for controlling the imaging apparatus as claimed in claim 10, wherein the determining the focal region comprises:

calculating movement distances of the lens to perform focusing with respect to the sub-regions of the first to third pairs;

determining one of the pairs having the greatest difference between the movement distances of the lens among the first to third pairs; and determining one of the sub-regions of the pair having the greatest difference as the focal region.

13. The method for controlling the imaging apparatus as claimed in claim 12, wherein the determining the focal region further comprises:

displaying a user interface (UI) that indicates the pair having the greatest difference between the movement distances of the lens;

receiving a user input that selects one of the pairs having the greatest difference between the movement distances of the lens; and determining one of the sub-regions of the selected pair as the focal region.

14. The method for controlling the imaging apparatus as claimed in claim 11, wherein the dividing the region of interest comprises dividing the region of interest into M rows and N columns to obtain the plurality of sub-regions having the same size, and the determining the focal region comprises grouping of adjacent ones of the plurality of sub-regions in response to a difference between movement distances of the lens with respect to the adjacent sub-regions of interest is equal to or smaller than a predetermined value.

15. The method for controlling the imaging apparatus as claimed in claim 14, wherein the plurality of sub-regions form at least one of a first group having the shortest distance to the object, a second group having the highest reliability, and a third group to which the largest number of sub-regions of interest belong, the determining the focal region further comprises determining one of the first group, the second group, and the third group as the focal region.

16. The method for controlling the imaging apparatus as claimed in claim 14, wherein the determining the focal region further comprises grouping only one or more of the plurality of sub-regions which have a reliability higher than a predetermined value.

17. The method for controlling the imaging apparatus as claimed in claim 11, wherein the movement distance of the lens is information that is determined from the disparity information calculated through phase auto focus with respect to the position of the lens.

18. The method for controlling the imaging apparatus as claimed in claim 10, wherein the calculating the disparity information comprises capturing two of the images using two of the phase sensing pixels that correspond to the plurality of sub-regions of interest, and calculating the disparity information through cross-correlation of the two images.

* * * * *